United States Statutory Invention Registration [19]

[11] Reg. Number: H925

Sayles [43] Published: Jun. 4, 1991

[54] ENCAPSULATED SIGNAL ILLUMINATION FLARE COMPOSITION

[75] Inventor: David C. Sayles, Madison, Ala.

[73] Assignee: The United States of America as represented by the Secretary of the Army, Washington, D.C.

[21] Appl. No.: 440,065

[22] Filed: Nov. 22, 1989

[51] Int. Cl.[5] ..... F42B 7/02; F42B 33/00; F42B 4/26; C06B 31/00

[52] U.S. Cl. ..... 86/12; 86/20.11; 149/45; 149/44; 149/108.2; 149/19.5; 149/109.6; 149/106; 149/116; 149/19.92; 264/3.1; 102/336; 102/361

*Primary Examiner*—Peter A. Nelson
*Attorney, Agent, or Firm*—James T. Deaton; Fred M. Bush

[57] ABSTRACT

An encapsulated signal illuminant flare composition is comprised of powdered magnesium from about 45 to about 60 weight percent, of powdered sodium nitrate from about 32 to about 49 weight percent, and of capsular adhesives containing about 91 weight liquid materials contained within capsules having cell walls of equal parts Arabic gum and gelatin of about 9 weight percent to yield a binder from about 6 to about 12 weight percent. The composition ingredients are blended in a dry mixer to achieve a homogeneously, blended signal illuminant flare composition. The blended signal illuminant flare composition is incrementally fed into a flare press for compacting into cartridges in two increments at about 14,000 psi pressure which ruptures the capsular adhesives by hydraulic forces to achieve polymer mixing and the surrounding of the powder ingredients with the binder ingredients to form a very homogenous signal illuminant flare composition mass. The flare composition mass is cured for about 16 hours at a minimum temperature of about 170° F. The capsular adhesives are blended of about one part of an epoxy adhesive to two parts of a polyester adhesive. The capsular epoxy adhesive is comprised of about 79 weight percent diglycidyl ether of Bisphenol A and of about 12 weight percent of benzoyl peroxide contained in capsules having cell walls comprised of Arabic gum and gelatin of about 9 weight percent. The capsular polyester adhesive is comprised of about 86 weight percent polyester resin, of about 5 weight percent N, N'-dimethyl-o-toluidine contained in capsules having cell walls comprised of Arabic gum and gelatin of about 9 weight percent.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ENCAPSULATED SIGNAL ILLUMINATION FLARE COMPOSITION

DEDICATORY CLAUSE

The invention described herein may be manufactured, used, and licensed by or for the Government for governmental purposes without the payment to me of any royalties thereon.

BACKGROUND OF THE INVENTION

The present method for signal flare manufacture involves using a high-shear muller type mixer because the binder is viscous and highly adhesive. The use of a cured Laminac 4116 type binder even with mixing performed with a muller type mixer makes mixing difficult, and particularly, homogeneity of the ingredients is difficult to achieve. The mixing problems are attributed to the highly viscous and adhesive properties of the Laminac 4116 type binder. Because of the employment of this method of mixing, loss of materials due to hang-ups, time consumed in cleaning and equipment, and batch mixing due to the short potlife of the binder are contributing factors to substantial capital expenditures.

SUMMARY OF THE INVENTION

The object of this novel method for the manufacture of signal illuminant flare compositions is to provide an encapsulated binder whereby the flare ingredients of magnesium powder, sodium nitrate, and an capsulated adhesive are blended to achieve homogeneity of ingredients prior to feeding into a flare press. When the specified ingredients are pressed in the flare-producing press, the binder capsules are crushed and the other ingredients, sodium nitrate and magnesium are bonded into a solid flare mass.

The instant invention involves the use of PEF-12 capsular adhesive without the titanium dioxide filer. This material is manufactured by the National Cash Register Company. The adhesive consists of two separate capsules which are blended together. One capsule contains the condensation products of epichlorohydrin and Bisphenol A or diglycidyl ether of Bisphenol A (EPON 828) 79% with 12% benzoyl peroxide. The second capsule contains Aropol 72-40-MC polyester resin with 5% N,N'-dimethyl-o-toluidine as the cure accelerator. The cell walls of both capsules are composed of Arabic gum and gelatin. They are produced using the coacervation technique. The capsules are blended in the order of one part epoxy capsule to two parts polyester capsule. The capsule sizes range from 300–1000 micrometers. When blended together, the capsules form a blend which performs as a free-flow powder containing 91% liquid materials with cell walls composed of about 9% Arabic gum and gelatin.

The encapsulated illuminant compositions are manufactured by dry blending magnesium powder, sodium nitrate and the encapsulating binder. A quantity of flare increment is supplied by a flare increment feeder to a compacting flare press. The force of the compacting press causes rupture of the capsules, and the hydrualic force causes the polymers to mix, and surround the powders resulting in a very homogeneous mass.

The illuminant compositions are compacted into paper containers (31-mm in diameter and 64-mm long) similarly to the standard M127A1 Hand-Held Signal Illuminants. The candles were compacted in two increments, 14,000 psi and cured for 16 hours at a minimum temperature of 170° F.

DESCRIPTION OF THE PREFERRED EMBODIMENT

The signal illuminant flare composition prepared in accordance with this invention employs a capsular adhesive composition as the binder in two separate capsules which are blended in equal amounts together to form blend which performs as a free-flow powder containing 91% liquid material. The capsules are ruptured when subjected to the force of the compacting press used to consolidate the flare composition, and the resulting hydraulic forces causes the curable polymer to mix and surround the powders resulting in a very homogeneous mass.

TABLE 1

CAPSULAR ADHESIVE COMPOSITION*

| Capsule No | Content | Weight Percent |
|---|---|---|
| 1 | Diglycidyl ether of Bisphenol A** | 79.0 |
| | Benzoyl peroxide | 12.0 |
| | Arabic gum and gelatin (1:1) | 9.0 |
| | | 100.0 |
| 2 | Polyester resin*** | 86.0 |
| | N,N'-dimethyl-o-toluidine | 5.0 |
| | Arabic gum and gelatin (1:1) | 9.0 |
| | | 100.0 |

Figure 1:
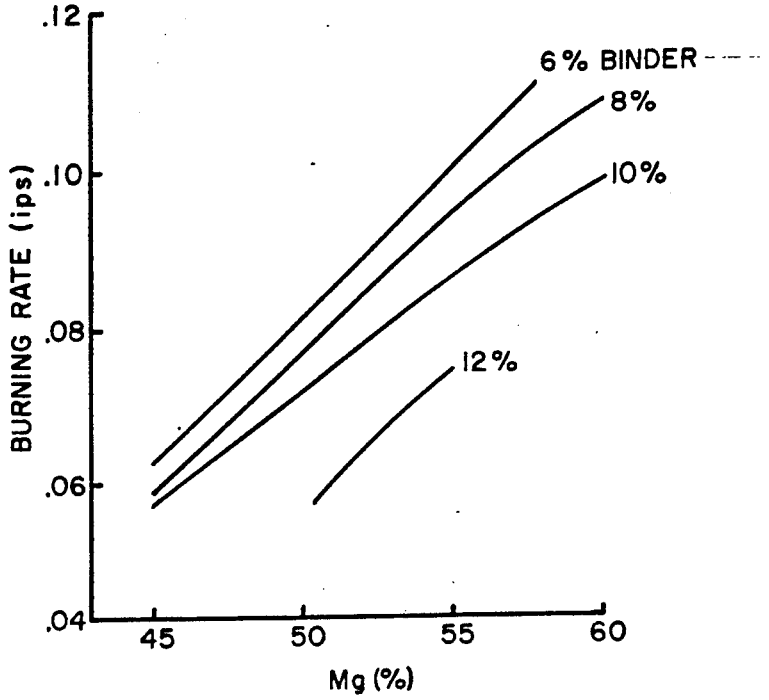
FIG. 1 depicts flare burning rate, inches per second (ips), as influenced by magnesium and binder content.
Figure 2:
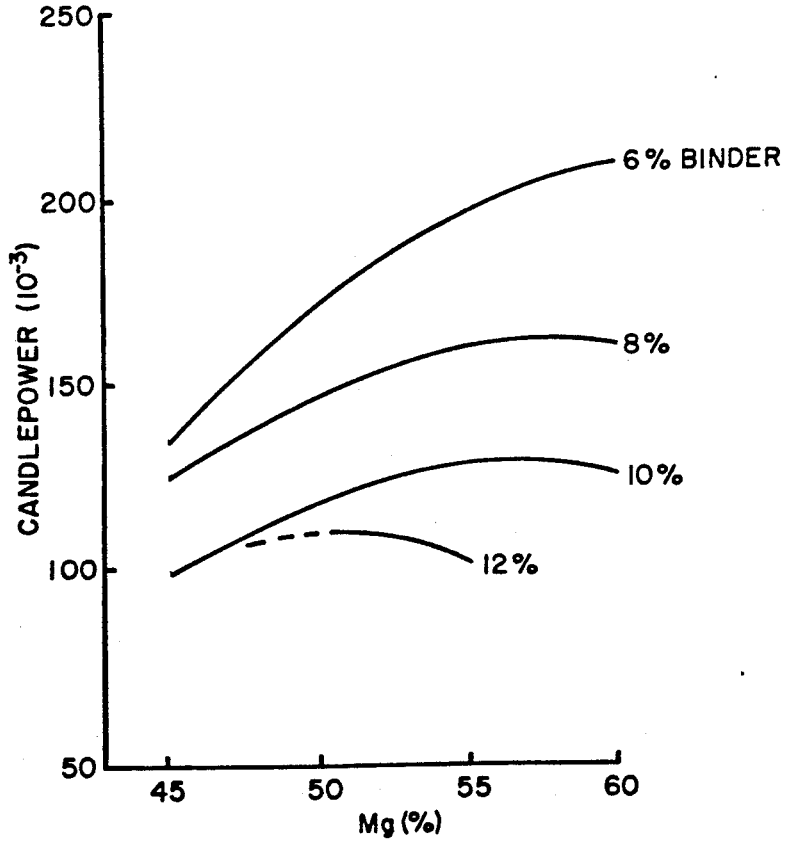
FIG. 2 depicts candlepower output as influenced by magnesium and binder content.

*PEF-12- Manufactured hy National Cash Register Company
**EPON 828
*Aropol 72-40-MC The percentage of binder, and the magnesium content, which are incorporated in the illuminant compositions influence the burning rate and the candlepower output thereof. These data are presented in Table 2 below and illustrated graphically in FIGS. 1 and 2**.

TABLE 2

EFFECT OF BINDER AND MAGNESIUM CONTENTS ON FLARE BURNING RATE AND CANDLEPOWER

| Mix No. | Binder (%) | Mg (%) | Density (gm/cc) | Burning Rate (IPS)* | Candlepower |
|---|---|---|---|---|---|
| 1 | 6 | 45 | 1.808 | 0.0640 | 137,400 |
| 2 | 6 | 50 | 1.762 | 0.0799 | 173,300 |
| 3 | 6 | 55 | 1.707 | 0.0996 | 202,400 |
| 4 | 6 | 57 | 1.686 | 0.1119 | 201,400 |
| 5 | 8 | 45 | 1.847 | 0.0573 | 127,400 |
| 6 | 8 | 50 | 1.794 | 0.0748 | 151,100 |
| 7 | 8 | 55 | 1.754 | 0.0966 | 161,400 |
| 8 | 8 | 60 | 1.696 | 0.1110 | 161,700 |
| 9 | 10 | 45 | 1.858 | 0.0580 | 101,800 |
| 10 | 10 | 50 | 1.815 | 0.0730 | 119,500 |
| 11 | 10 | 55 | 1.764 | 0.0870 | 130,900 |
| 12 | 10 | 60 | 1.728 | 0.0996 | 126,600 |
| 13 | 12 | 50 | 1.863 | 0.0548 | 115,100 |

TABLE 2-continued

EFFECT OF BINDER AND MAGNESIUM CONTENTS ON FLARE BURNING RATE AND CANDLEPOWER

| Mix No. | Binder (%) | Mg (%) | Density (gm/cc) | Burning Rate (IPS)* | Candlepower |
|---|---|---|---|---|---|
| 14 | 12 | 55 | 1.787 | 0.0752 | 103,800 |

Notes: *IPS = inches per second
1. Illuminant weight = 85 grams
2. Magnesium powder −30/50 micrometers weight-means-diameter by sieve analysis
3. Sodium nitrate −20-micrometers weight-mean-diameter by Fisher Sub-sieve sizer; 55-micrometers weight-mean-diameter by sieve analysis A crush resistant strength test was used to compare the mechanical properties of this illuminant. This involved the preparation of 20-gram samples which are consolidated at 14,000 psi in a 1.0 inch diameter die. The reference for evaluation was the standard illuminant composition which had been cured for 10 days at ambient temperature. Ballistic compositions of illuminant ammunition which had been cured under these conditions have performed satisfactorily, and, therefore, the crush strength measured on these standards has been defined as adequate. The encapsulated binder pellets demonstrated better crush strength over the temperature range of −65° F. to +160° F. than the standard pellets based on Laminac 4116.

Friction and drop sensitivity tests were conducted to determine the safety characteristics of these Illuminants. The drop sensitivity of the illuminant containing the encapsulated ingredients were determined to be less sensitive than the standard M127A1 illuminant. The M127A1 illuminant had a drop sensitivity of 19 inches with a 4 pound ball. The illuminant containing the encapsulated binder had a drop sensitivity of 30 inches with a 4 pound ball. Thus, the safety aspects which would result from the adoption of the illuminant containing the encapsulated binder would be lower impact sensitivity, reduced safety hazards in manufacture, significant capital cost savings and manufacturing costs.

Figure 3:
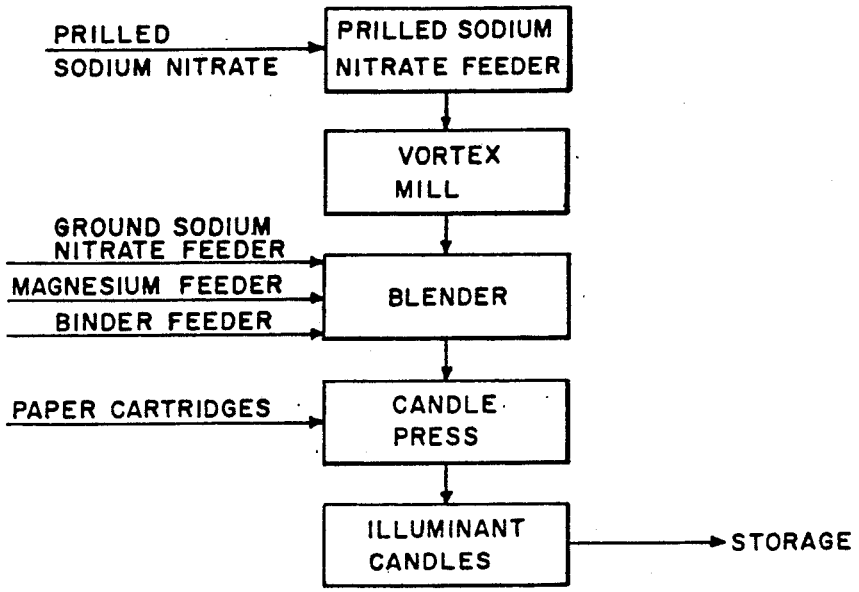
FIG. 3 PRIOR ART
FIG. 3 depicts a flow diagram for manufacture of M127A1 illuminant flares in accordance with prior art manufacturing sequences.
Figure 4:
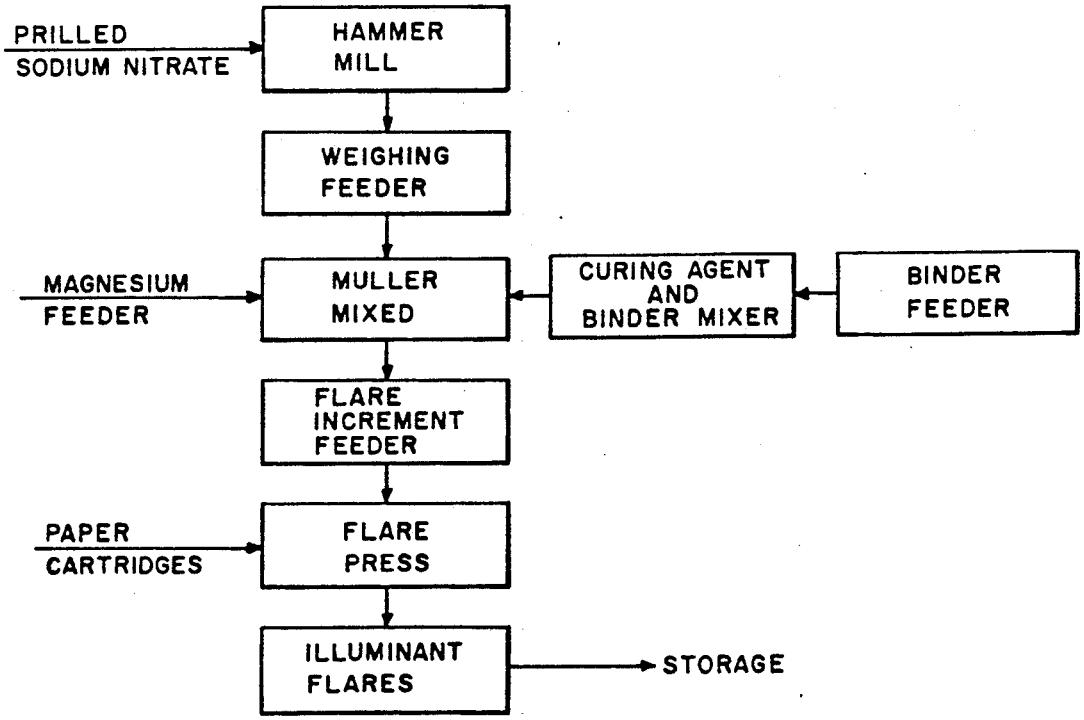
FIG. 4 depicts a flow diagram for the manufacture of encapsulated signal illuminant flares.

A flow diagram for the manufacture of M127A1 signal illuminant flares is depicted in FIG. 3, and the flow diagram for the manufacture of encapsulated signal illuminant flares is depicted in FIG. 4.

The mechanism of capsular rupturing of the two component capsular adhesive or the curable polymer materials defined in Table I provides a unique means for mixing and consolidating materials for signal illuminant flares. In addition to the fact that this new process offers ease of manufacture, other benefits derived include the following:

a. Savings in capital equipment,
b. Improved safety,
c. Reduced exposure of personnel to hazardous operations,
d. Continuous processing instead of bath processing, and
e. Lower operating/maintenance costs.

I claim:

1. A method for the manufacture of a signal illuminant utilizing a signal illuminant flare composition wherein the binder composition of said signal illuminant flare composition is formed from ingredients released from ruptured capsules during the mixing procedure, said capsules having cell walls comprised of Arabic gum and gelatin for containing the ingredients for forming said binder composition and wherein said capsules flow as a free-flow powder until subjected to a compacting force which ruptures the cell walls during a mixing procedure to thereby release said ingredients, said method comprising:

(i) feeding milled sodium nitrate into a hammer mill and milling the same to a powder to achieve a particle size from about 20 micrometers to about 55 micrometers weight-mean-diameter by sieve analysis;

(ii) admitting said milled sodium nitrate from a weighing feeder to an operating dry mixer in a weight percent range from about 32 to about 49 of said signal illuminant flare compositions which is additionally comprised of magnesium powder of about 30 to about 50 weight-mean-diameter in an amount from about 45 weight percent to about 60 weight percent of said signal illuminant flare composition and said binder composition from about 6 to about 12 weight percent of said signal illuminant flare composition;

(iii) admitting said magnesium powder to said operating dry mixer in a weight percent range from about 45 to about 60 of said signal illuminant flare composition;

(iv) blending capsular adhesives ranging in sizes from about 300 to about 1000 micrometers in a ratio of one part of an epoxy adhesive to two parts of a polyester adhesive to achieve when blended, a blend which performs as a free-flow powder containing 91% liquid materials contained within capsules having cell walls composed of about 9% Arabic gum and gelatin in equal ratio amounts, said epoxy adhesive comprised of about 79.0 weight percent diglycidyl ether of Bisphenol A and of about 12.0 weight percent of benzoyl peroxide contained in capsules having cell walls comprised of said Arabic gum and gelatin of about 9.0 weight percent, said polyester adhesive comprised of about 86.0 weight percent polyester resin and of about 5.0 weight percent N,N'-dimethyl-o-toluidine contained in capsules having cell wall comprised of said Arabic gum and gelatin of about 9.0 weight percent;

(v) admitting said capsular adhesive blend to said operating dry mixer in a weight percent range from about 6 to about 12 weight percent of said signal illuminant flare composition ingredients to achieve homogeneity;

(vi) feeding said homogeneously, blended signal illuminant flare composition into a flare increment feeder for incremental feeding the same into a flare press for compacting into paper cartridges;

(vii) compacting said blended signal illuminant flare composition into a paper cartridge in two increments while employing 14,000 psi pressure which ruptures said capsular adhesives by hydraulic forces to achieve polymer mixing and the surrounding of the powder ingredients with said binder ingredients to thereby form a very homogeneous signal illuminant flare composition mass; and (viii) curing said homogeneous signal illuminant flare composition mass for about 16 hours at a maximum temperature of about 170° F. to yield said signal illuminant flare.

2. The signal illuminant flare manufactured by the method of claim 1 wherein said flare has a density in grams per cubic centimeter, a burning rate in inches per second, and a candlepower which varies in a accordance with said binder weight percent and said magnesium weight percent as set forth below for said signal illuminant flare composition having mix numbers 1–4 as follows:

| Mix No. | Binder % | Mg (%) | Density (gm/cc) | Burning Rate (ips) | Candlepower |
|---|---|---|---|---|---|
| 1 | 6 | 45 | 1.808 | 0.0640 | 137,400 |
| 2 | 6 | 50 | 1.762 | 0.0799 | 173.300 |
| 3 | 6 | 55 | 1.707 | 0.0996 | 202.400 |

-continued

| Mix No. | Binder % | Mg (%) | Density (gm/cc) | Burning Rate (ips) | Candlepower |
|---|---|---|---|---|---|
| 4 | 6 | 57 | 1.686 | 0.1119 | 201,400 |
| 5 | 8 | 45 | 1.847 | 0.0748 | 151,100 |
| 6 | 8 | 50 | 1.794 | 0.0748 | 151,100 |
| 8 | 8 | 60 | 1.696 | 0.1110 | 161,700 |
| 9 | 10 | 45 | 1.858 | 0.0580 | 101,800 |
| 10 | 10 | 50 | 1.815 | 0.0730 | 119,500 |
| 11 | 10 | 55 | 1.764 | 0.0870 | 130,900 |
| 12 | 10 | 60 | 1.728 | 0.0996 | 126,600 |
| 13 | 12 | 50 | 1.863 | 0.0548 | 115.100 |
| 14 | 12 | 55 | 1.787 | 0.0752 | 103,800 |

* * * * *